US010584761B2

(12) United States Patent
Fourman

(10) Patent No.: US 10,584,761 B2
(45) Date of Patent: Mar. 10, 2020

(54) VERTICAL DECOUPLER FOR A HYDRAULIC MOUNT

(71) Applicant: BeijingWest Industries Co., Ltd., Beijing (CN)

(72) Inventor: Brent Fourman, New Paris, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/821,648

(22) Filed: Nov. 22, 2017

(65) Prior Publication Data

US 2018/0187742 A1     Jul. 5, 2018

Related U.S. Application Data

(60) Provisional application No. 62/441,648, filed on Jan. 3, 2017.

(51) Int. Cl.
*F16F 13/10*     (2006.01)

(52) U.S. Cl.
CPC .......... *F16F 13/102* (2013.01); *F16F 13/106* (2013.01); *F16F 13/107* (2013.01); *F16F 2230/32* (2013.01)

(58) Field of Classification Search
CPC ....... F16F 13/102; F16F 13/106; F16F 13/107
(Continued)

(56) References Cited

U.S. PATENT DOCUMENTS

| 4,679,776 A | 7/1987 | Remmel et al. |
| 5,102,105 A * | 4/1992 | Hamaekers ............. F16F 13/18 180/902 |

(Continued)

FOREIGN PATENT DOCUMENTS

| CN | 201382116 Y | 1/2010 |
| CN | 203972842   | 11/2014 |

(Continued)

OTHER PUBLICATIONS

Extended European Search Report dated Jun. 5, 2018 for counterpart European Patent Application No. EP18150041.4, Nine Pages.

(Continued)

*Primary Examiner* — Robert A. Siconolfi
*Assistant Examiner* — San M Aung
(74) *Attorney, Agent, or Firm* — William H. Honaker; Dickinson Wright PLLC

(57) ABSTRACT

A vertical decoupler assembly for a hydraulic mount including a first fluid chamber and a second fluid chamber includes a travel plate defining an interior space for receiving a removable vertical decoupler assembly. The vertical decoupler assembly includes an elastically deformable and tubular shaped diaphragm for dampening small vibrations across the mount. The vertical decoupler assembly may include an inner cage and an outer cage, each including a rigid, perforated, tubular wall disposed on either side of the diaphragm for limiting its radial deflection in each direction. The vertical decoupler assembly may include a rigid lower insert having an inverted cup shape with a second rim sealingly engaging the diaphragm and secured to the inner and outer cages. The decoupler diaphragm also includes a flange and a ring-shaped upper insert for nesting within and sealing against a throat at the upper end of the travel plate.

20 Claims, 3 Drawing Sheets

(58) Field of Classification Search
USPC .................................................. 267/140.13
See application file for complete search history.

(56) References Cited

U.S. PATENT DOCUMENTS

| | | | |
|---|---|---|---|
| 5,183,243 A | 2/1993 | Matsumoto | |
| 6,390,459 B2 | 5/2002 | Saitoh | |
| 2006/0006591 A1* | 1/2006 | Grassmuck | F16F 13/106 267/140.11 |
| 2011/0291335 A1* | 12/2011 | Rooke | F16F 13/102 267/140.13 |
| 2012/0061889 A1 | 3/2012 | Goudie | |
| 2014/0360799 A1* | 12/2014 | Farjoud | F16F 13/264 180/291 |

FOREIGN PATENT DOCUMENTS

| | | | | |
|---|---|---|---|---|
| CN | 104806688 | | 7/2015 | |
| EP | 2711585 A1 | | 3/2014 | |
| EP | 2820321 A1 | | 1/2015 | |
| GB | 2124326 A | * | 2/1984 | ............... F16F 9/08 |
| JP | 5947541 A | | 3/1984 | |
| JP | 59047541 A | * | 3/1984 | ............ F16F 13/106 |
| JP | 2006200590 A | | 8/2006 | |
| WO | 2007065761 A1 | | 6/2007 | |

OTHER PUBLICATIONS

First Office Action and Search Report dated Feb. 11, 2019 for corresponding Chinese Patent Application 201711210788.9 and translation.

\* cited by examiner

VERTICAL DECOUPLER FOR A HYDRAULIC MOUNT

CROSS REFERENCE TO RELATED APPLICATION

This U.S. utility patent application claims the benefit of U.S. provisional application No. 62/441,648, filed Jan. 3, 2017, the contents of which are incorporated herein by reference in its entirety.

BACKGROUND OF THE INVENTION

1. Field of the Invention

The present invention relates to a hydraulic mount for supporting a vibration source on a base, more particularly to a vertical decoupler assembly for such a hydraulic mount.

2. Description of the Prior Art

It is generally known in the field of hydraulic mounts to include a decoupler assembly having a diaphragm dividing two fluid chambers from one another and being elastically deformable for dampening small vibrations across the mount. Such diaphragms are generally planar and include rigid portions to limit the amount of deflection provided. One such prior art mount is disclosed in U.S. Pat. No. 6,361,031 (the '031 patent), which includes a decoupler diaphragm that "vibrates in response to vibrations below a predetermined amplitude, thereby absorbing the energy applied to the damping fluid and preventing the damping fluid from communicating through the orifice track or damping channel." The '031 patent further describes: "At the predetermined vibratory amplitude, the decoupling diaphragm . . . ceases to move in response to vibratory inputs to the damping fluid, and the damping fluid begins to be pumped through the damping channel or orifice track."

SUMMARY OF THE INVENTION

The invention provides for a vertical decoupler assembly for a hydraulic mount comprising a diaphragm dividing a first fluid chamber from a second fluid chamber and being elastically deformable for dampening small vibrations across the mount. The diaphragm is generally tubular and radially deformable in response to a pressure differential between the first fluid chamber and a second fluid chamber. The vertical decoupler assembly also includes an inner cage with a first wall disposed inside the diaphragm and extending along substantially the entire length of the diaphragm and spaced apart from the diaphragm by a predetermined distance for limiting the inward radial deflection of the diaphragm.

The subject invention provides for several advantages over the prior art. It provides for a decoupling diaphragm which does not require a rigid portion, thereby reducing the active mass of the decoupler. It provides for an integrated seal between the lower surface of the decoupler diaphragm and the travel plate and which is independent of the decoupler action. In other words, the decoupler assembly may be held in position with a wide range of clamping force without affecting its damping characteristics. It allows for the decoupler assembly to be provided as a module which can be verified before assembly into the larger mount. Such a modular decoupler assembly also allows for different vertical decoupler assemblies having different damping characteristics to be tailored to various vehicle requirements without modifications to the travel plate assembly or other structures of the mount.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 2:
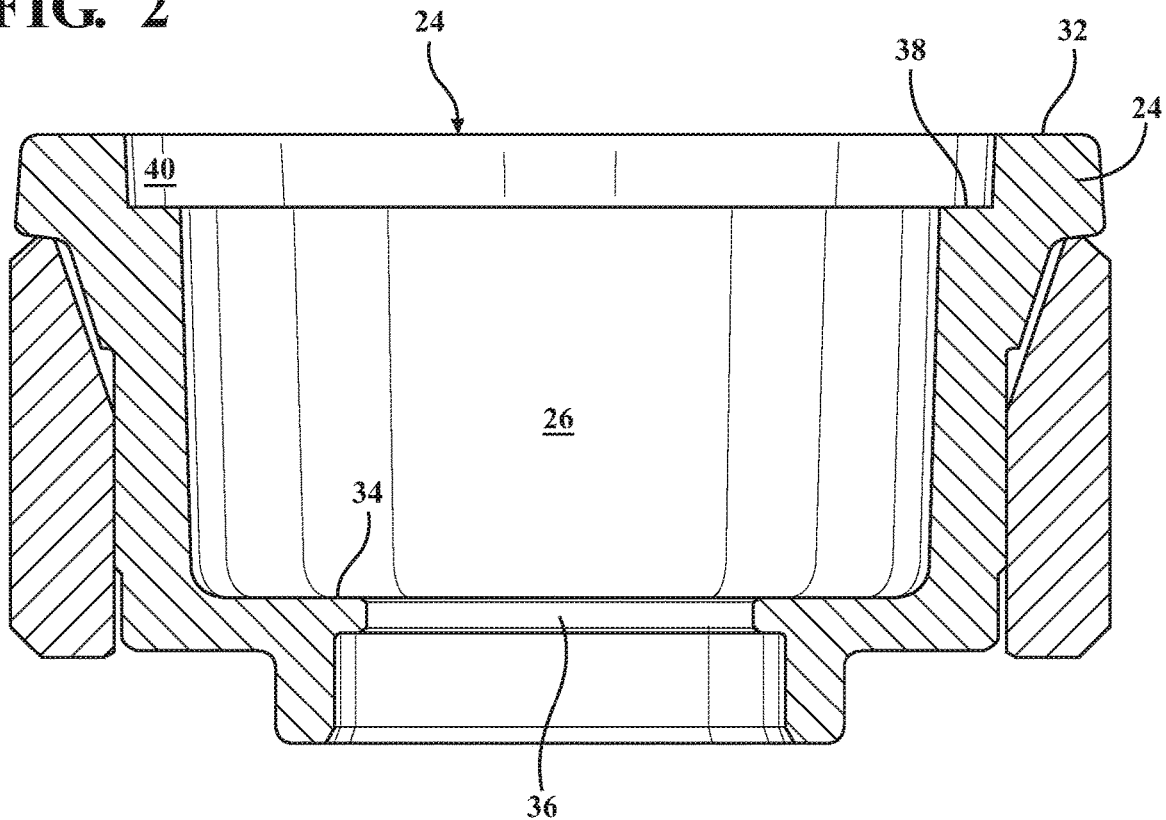
FIG. 2 is a cross-sectional view of a travel plate.
Figure 3:
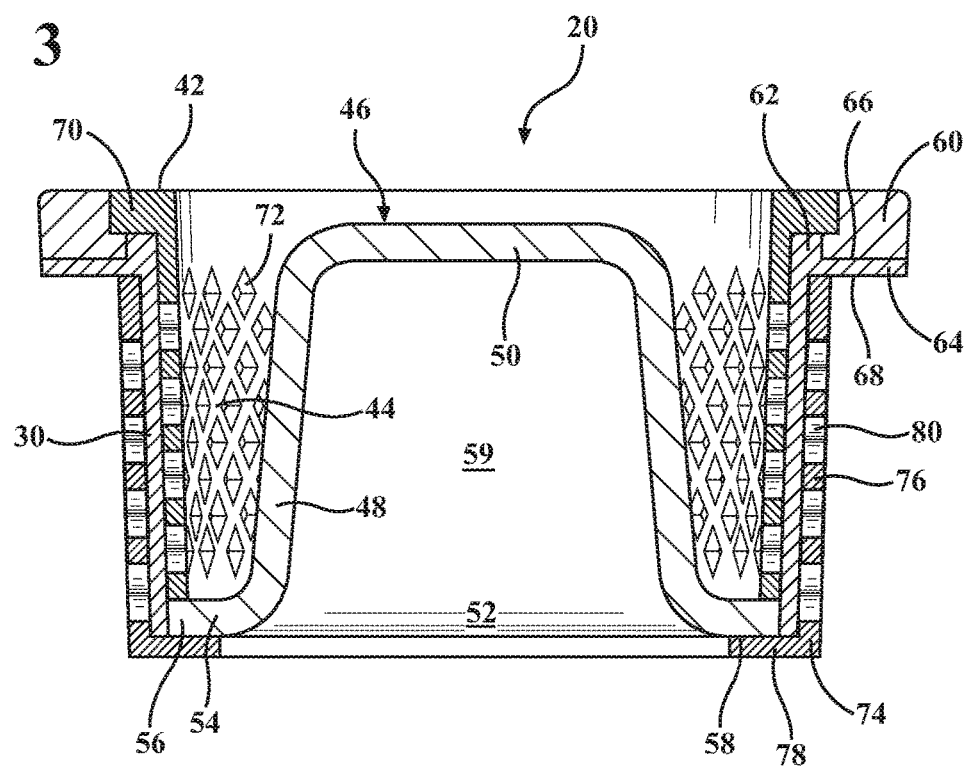
FIG. 3 is a cross-sectional view of a vertical decoupler assembly of the subject invention.
Figure 4:
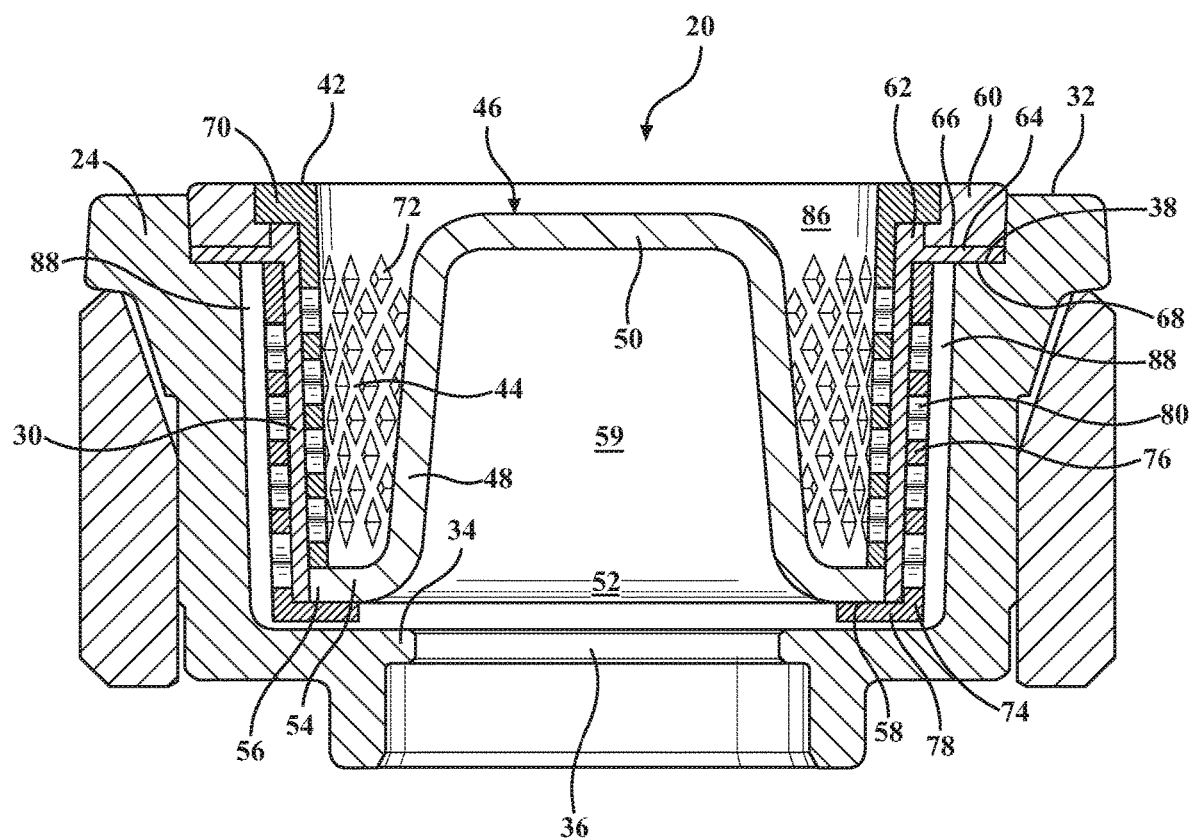
FIG. 4 is a cross-sectional view of a vertical decoupler assembly of the subject invention disposed within a travel plate.

Referring to the Figures, wherein like numerals indicate corresponding parts throughout the several views, a vertical decoupler assembly 20 for a hydraulic mount 22 including a first fluid chamber 86 and a second fluid chamber 88 is generally shown in FIGS. 3-4. The vertical decoupler assembly 20 includes a travel plate 24 defining a generally cylindrical interior space 26 for receiving the vertical decoupler assembly 20, as shown in FIG. 2.

As best shown in FIG. 4, the vertical decoupler assembly 20 fits within the interior space 26 of the travel plate 24. As shown in FIG. 3, the vertical decoupler assembly 20 includes a diaphragm 30 dividing the first fluid chamber 86 from the second fluid chamber 88 and which is elastically deformable for dampening small vibrations across the mount 22. The interior space 26 of the travel plate 24 extends from an open upper end 32 and down to a partially closed lower end 34, which extends radially inwardly to define a lower aperture 36. The travel plate 24 also defines a ledge 38 extending radially outwardly from the interior space 26 proximate to and spaced apart from the open upper end 32 to define a throat 40 with a generally rectangular cross-section between the ledge 38 and the open upper end 32. The vertical decoupler assembly 20 may include an inner cage 42 with a first wall 44 disposed inside the diaphragm 30 and extending along substantially the entire length of the diaphragm 30 and spaced apart therefrom by a predetermined distance for limiting the inward radial deflection of the diaphragm 30. In other words, the central section of the tubular diaphragm 30, which is able to radially deflect (i.e. bulge) inwardly, is limited in the amount which it is able to radially deflect by the first wall 44, which is inside of the diaphragm 30 along that entire central section.

As shown in FIGS. 3-4, the vertical decoupler assembly 20 may include a lower insert 46 of rigid material having an inverted cup shape with a generally tubular second wall 48 extending between a closed upper end 50 and an open end 52 with a second rim 54 extending radially outward to an outer end 56 and defining a bottom surface 58. The lower insert 46 may also enclose an auxiliary fluid chamber 59 in fluid communication with the second fluid chamber 88, and providing additional compressible air space to accommodate the diaphragm 30 being displaced outwardly. The vertical decoupler assembly 20 may also include a generally ring shaped upper insert 60 for nesting within the throat 40 of the travel plate 24. The diaphragm 30 is generally tubular and formed of resilient material, radially deformable in response to a pressure differential between the first fluid chamber 86 and a second fluid chamber 88. The diaphragm 30 may be sealed with the outer end 56 of the lower insert 46. The sealing engagement between the diaphragm 30 and the lower insert 46 may be provided by molding the diaphragm 30 together with the outer end 56 of the lower insert 46. The sealing engagement may be provided by other means including, but not limited to, an adhesive, weld, or a compression fit.

The diaphragm 30 may extend away from the outer end 56 of the lower insert 46 to a top portion 62 which may include a flange 64 extending radially outwardly to define an upper surface 66 in sealing engagement with the upper insert 60 and a lower surface 68 opposite the upper surface 66. The sealing engagement between the diaphragm 30 and the upper insert 60 may be provided by molding the flange 64 together with the upper insert 60. The sealing engagement may be provided by other means including, but not limited to an adhesive, weld, or a compression fit.

As shown in FIGS. 3-4, the vertical decoupler assembly 20 may include an inner cage 42 of rigid material including a generally tubular first wall 44 disposed inside along and spaced apart from the diaphragm 30 by a predetermined distance for limiting the inward radial deflection of the diaphragm 30. The first wall 44 may extend from the outer end 56 of the lower insert 46 to a top rim 70, which is disposed annularly about and extends radially outwardly from the first wall 44 over the upper surface 66 of the diaphragm 30 and sealing against the upper insert 60. The first wall 44 defines a plurality of first perforations 72 therethrough for allowing fluid in the first fluid chamber 86 to contact the diaphragm 30. The first perforations 72 may have a regular pattern such as the diamond shape shown in the figures, and may extend around part or the entire first wall 44.

The vertical decoupler assembly 20 may also include an outer cage 74 of rigid material and including a generally tubular third wall 76 and disposed around and spaced apart from the diaphragm 30 by a predetermined distance for limiting the outward radial deflection of the diaphragm 30. As shown in FIGS. 3-4, the third wall 76 may extend to a bottom rim 78 which extends annularly and radially inwardly for sealing against the bottom surface 58 of the lower insert 46. The third wall 76 defines a plurality of second perforations 80 therethrough for allowing fluid in the second fluid chamber 88 to contact the diaphragm 30. The second perforations 80 may have a regular pattern such as the diamond shape shown in the figures, and may extend around part or the entire third wall 76. The first and second perforations 72, 80 may be offset such that they are misaligned from one-another.

The vertical decoupler assembly 20 may removably disposed in the interior space 26 of the travel plate 24. As shown in FIG. 4, the upper insert 60 and the flange 64 of the vertical decoupler assembly 20 may nest within the throat 40, with the lower surface 68 sealingly engaging the ledge 38 of the travel plate 24. In this way, different vertical decoupler assemblies 20 having different dampening characteristics may be swapped into a standard mount 22 having a standard travel plate 24 for different applications.

Figure 1:
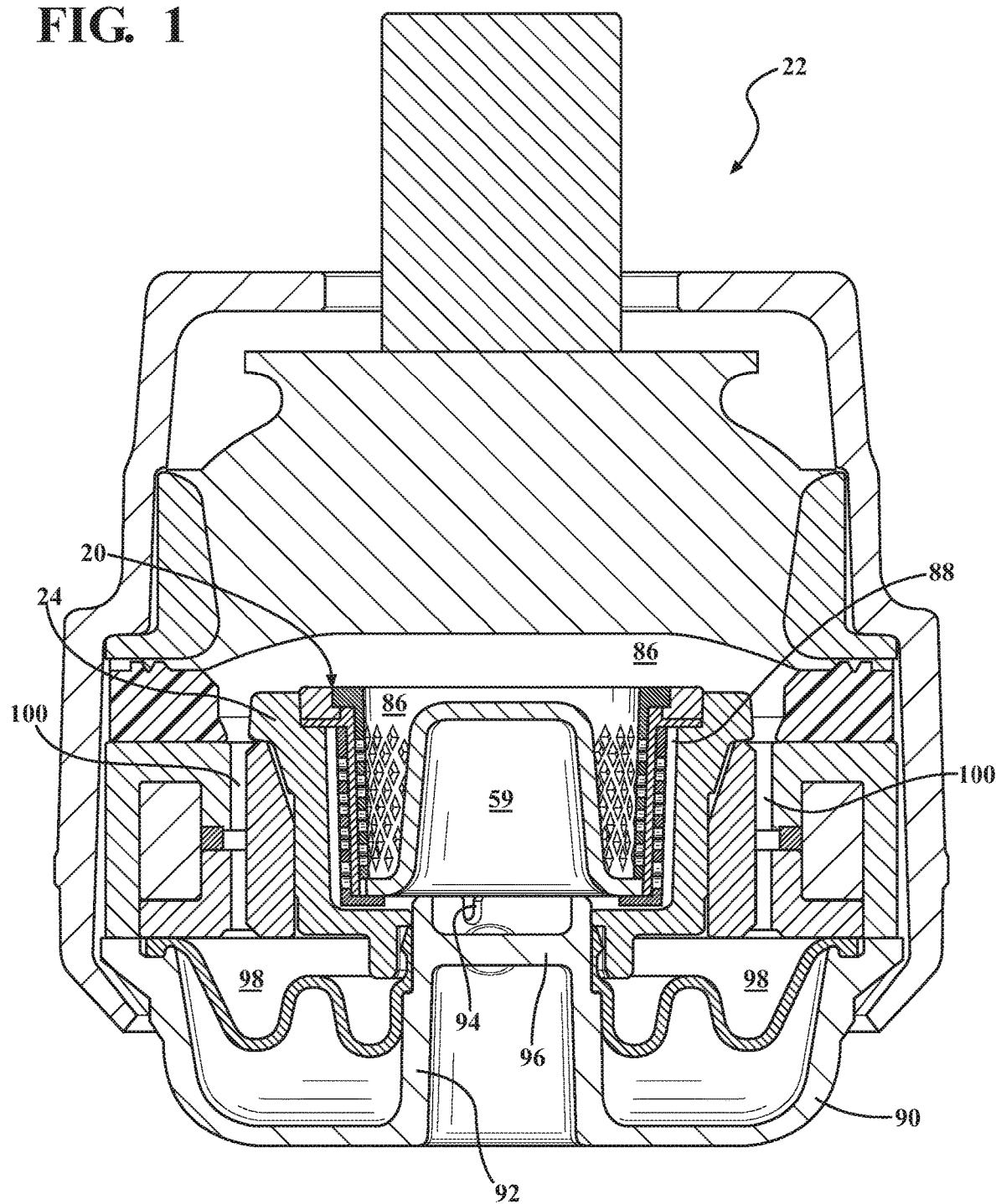
FIG. 1 is a hydraulic mount including a vertical decoupler assembly of the subject invention.

As shown in FIG. 1, the mount 22 may include a lower housing 90 with a central pillar 92 which extends into the lower aperture 36 of the travel plate 24. The central pillar 92 may be hollow to allow fluid communication between the second fluid chamber 88 and the ambient atmosphere. The central pillar 92 may also define a notch 94 to provide the fluid communication therebetween and to allow any foreign matter, such as condensate, to drain from the second fluid chamber 88 along the partially closed lower end 34 of the travel plate 24, and out to atmosphere. The central pillar 92 may also include a cross-brace 96 providing structural rigidity while allowing fluid such as air to pass therethrough. The mount 22 may further include a third fluid chamber 98 and may also include one or more bypass passages 100 connecting the first fluid chamber 86 and the third fluid chamber 98 to permit fluid to pass therebetween, particularly in response to large vibrations above a predetermined amplitude. In other words, small amplitude vibrations across the mount 22 may cause the diaphragm 30 to be displaced by up to a predetermined distance, while larger amplitude vibrations may exceed the capacity of the diaphragm 30 and may cause fluid to pass through the bypass passages 100 between the first and third fluid chambers 86, 98.

As disclosed in FIGS. 1 and 4, and as described above, the second fluid chamber 88 and the auxiliary fluid chamber 59 may be in fluid communication with the ambient atmosphere and may thereby be filled with air. The subject vertical decoupler assembly 20 may also be used in a hydraulic mount 22 in which the second fluid chamber 88 and/or the auxiliary fluid chamber 59 are filled with a gas or liquid other than air, such as, for example hydraulic oil or magnetorheological fluid. The second fluid chamber 88 may, for example, be in fluid communication with the first fluid chamber 86 and/or the third fluid chamber 98 and not in fluid communication with the ambient atmosphere.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A vertical decoupler assembly for a hydraulic mount including a first fluid chamber and a second fluid chamber and comprising:
   a diaphragm dividing the first fluid chamber from the second fluid chamber and being elastically deformable for dampening small vibrations across the mount, and said diaphragm being generally tubular and radially deformable in response to a pressure differential between the first fluid chamber and the second fluid chamber;
   an inner cage with a first wall disposed inside said diaphragm and extending along substantially the entire length thereof and spaced therefrom by a predetermined distance for limiting the inward radial deflection of said diaphragm; and
   wherein the second fluid chamber is in fluid communication with the ambient atmosphere.

2. The vertical decoupler assembly as set forth in claim 1 wherein said first wall defines a first perforation therethrough for allowing fluid in the first fluid chamber to contact said diaphragm.

3. The vertical decoupler assembly as set forth in claim 1 further including an outer cage including a third wall disposed around and spaced apart from said diaphragm by a predetermined distance for limiting the outward radial deflection of said diaphragm.

4. The vertical decoupler assembly as set forth in claim 3 wherein said third wall defines a second perforation therethrough for allowing fluid in the second fluid chamber to contact said diaphragm.

5. The vertical decoupler assembly as set forth in claim 1 further including a lower insert having an inverted cup shape with a second wall extending between a closed upper end and a second rim defining an open end.

6. The vertical decoupler assembly as set forth in claim 5 wherein said lower insert encloses an auxiliary fluid chamber in fluid communication with the second fluid chamber.

7. The vertical decoupler assembly as set forth in claim 5 wherein said second rim of said lower insert extends radially outward to an outer end; and
said first wall extends from said outer end of said lower insert to a top rim.

8. The vertical decoupler assembly as set forth in claim 5 wherein said second rim of said lower insert extends radially outward to an outer end; and
said diaphragm sealingly engaging said outer end of said lower insert.

9. The vertical decoupler assembly as set forth in claim 5 further including an outer cage including a third wall disposed outside and spaced apart from said diaphragm by a predetermined distance for limiting the outward radial deflection of said diaphragm; and
said third wall further includes a bottom rim in sealing engagement with said second rim of said lower insert.

10. The vertical decoupler assembly as set forth in claim 9 wherein said second rim of said lower insert defines a bottom surface and said bottom rim of said third wall extends annularly and radially inwardly for sealing against said bottom surface of said lower insert to provide the sealing engagement between said lower insert and said third wall.

11. A hydraulic mount including the vertical decoupler assembly as set forth in claim 1, further including a third fluid chamber and a bypass passage allowing the hydraulic fluid to flow between said first fluid chamber and said third fluid chamber.

12. A hydraulic mount including the vertical decoupler assembly as set forth in claim 1, further including a lower housing with a pillar defining a notch for allowing fluid communication between the second fluid chamber and the ambient atmosphere.

13. A hydraulic mount including the vertical decoupler assembly as set forth in claim 1, further including a travel plate defining an interior space; and
said vertical decoupler assembly being removably disposed in said interior space of said travel plate.

14. The hydraulic mount as set forth in claim 13 wherein said interior space of said travel plate extends between an open upper end and a partially closed lower end.

15. The hydraulic mount as set forth in claim 14 wherein said partially closed lower end extends radially inwardly and defines a lower aperture.

16. The hydraulic mount as set forth in claim 14 wherein said travel plate defines a ledge extending radially outwardly from said interior space spaced apart from said open upper end to define a throat between said ledge and said open upper end.

17. The hydraulic mount as set forth in claim 16 wherein said vertical decoupler assembly further includes an upper insert being generally ring shaped for nesting within said throat of said travel plate.

18. The hydraulic mount as set forth in claim 17 further including a top rim extending annularly about and radially outwardly from said first wall of said inner cage and sealing against said upper insert.

19. The hydraulic mount as set forth in claim 17 further including said diaphragm having a top portion including a flange extending annularly thereabout and defining an upper surface in sealing engagement with said upper insert and a lower surface opposite said upper surface for sealingly engaging said ledge of said travel plate.

20. A vertical decoupler assembly for a hydraulic mount including a first fluid chamber and a second fluid chamber and comprising:
a diaphragm dividing the first fluid chamber from the second fluid chamber and being elastically deformable for dampening small vibrations across the mount, and said diaphragm being generally tubular and radially deformable in response to a pressure differential between the first fluid chamber and the second fluid chamber;
an inner cage with a first wall disposed inside said diaphragm and extending along substantially the entire length thereof and spaced therefrom by a predetermined distance for limiting the inward radial deflection of said diaphragm; and
a lower insert having an inverted cup shape with a second wall extending between a closed upper end and a second rim defining an open end.

* * * * *